United States Patent Office 3,689,283
Patented Sept. 5, 1972

3,689,283
TREATMENT OF COOKED POULTRY
Kenneth Nathaniel May, State College, Miss., and Allison James Farr, Ithaca, N.Y., assignors to Calgon Corporation, Pittsburgh, Pa.
No Drawing. Filed Mar. 12, 1970, Ser. No. 19,117
Int. Cl. A22c 21/00
U.S. Cl. 99—107
7 Claims

ABSTRACT OF THE DISCLOSURE

This invention relates to the treatment of poultry following cooking to enhance its ability to retain moisture and water-soluble nutrients associated therewith and to improve oxidative stability. Immediately following cooking, the poultry is immersed in a solution of polyphosphate for cooling. The cooled poultry retains its moisture content more tenaciously and for a longer period than untreated poultry, and exhibits a fresh taste and appearance for an extended period.

BACKGROUND OF THE INVENTION

In U.S. Pat. 3,104,170, John H. Mahon disclosed that treatment of poultry with certain polyphosphates in the raw state will minimize organoleptic depreciation in the cooked state. In U.S. Pat. 3,462,278, Dr. Mahon disclosed that certain poultry or "fowl" may be cooked in a solution of certain polyphosphates, to obtain greater deboned yields and reduced cooking time. Accelerated cooling was obtained in the process of the latter patent by removing the fowl from the cooking vessel and immersing it in water.

SUMMARY OF THE INVENTION

We have discovered that polyphosphates can be most conveniently and efficiently applied to poultry by cooking the poultry and subsequently cooling it in a solution of polyphosphate. The results obtained with respect to thiobarbituric acid value are at least equivalent to those obtained through the separate extra step of injecting the phosphate, which is troublesome and time-consuming.

As is known in the art, the thiobarbituric acid value is a measure of oxidative deterioration, or rancidity.

The polyphosphates we may use are the alkali metal, non-cyclic molecularly dehydrated phosphates having a ratio of alkali metal oxide to $P_2O_5$ of from 1:1 to about 2:1. They may be fully or partially substituted salts of the corresponding phosphoric acids. The preferred phosphate is pentasodium tripolyphosphate.

In the studies described herein, frozen as well as fresh commercially processed broiler carcasses within a weight range of 800 to 1,000 grams were used. All frozen carcasses were thawed for 12 to 13 hours at room temperature, 23.5° to 24.5° C., before treatment.

Carcasses were cut up by removing and discarding a strip of the back and then cutting the remaining carcass into two portions containing one drumstick, one wing, one thigh and one split breast each. Each portion was weighed and placed into an identified net stocking. Thermocouples were inserted in the thigh, drumstick and breast of at least two portions in each cooking lot. Halves of the same carcass were used as replicate observations to reduce error.

The stockings were suspended in water or water plus salts held at 85±2° C. in a steam jacketed kettle until the lowest reading thermocouple reached 82° C. for a period of at least 20 minutes. The stockings containing the portions were then immersed in ice water slush or ice water slush plus salts for 5 minutes to stop the cooking process and cool the product. The stockings were then removed and the portions weighed and percent cook loss determined. Each portion was then wrapped in paper and frozen at −23° C. until used in further analyses.

Samples were then defrosted overnight at 3° to 4° C. Defrosting continued at room temperature for 3.5 hours. The breast and thigh of each sample was deboned and the meat, including skin, was combined and ground through a plate with 2.4 mm. diameter holes. Phosphate and sodium chloride analysis were determined by standard A.O.A.C. (1960) methods. Moisture was determined on duplicate 10 gram samples using an Ohaus moisture balance. Oxidative deterioration was determined by the 2-thiobarbituric (TBA) test described by Turner et al. (1954). TBA analysis was made at 24 hours and 7 to 8 days post defrosting. Samples were held in closed glass containers at 3° to 4° C. for the test intervals.

Some of the data relate results from the injection of the portions prior to cook with a combination of the two salts in solution using a Gland-O-Lac hand ovijector delivering about 0.3 ml. per injection. The number of injections per sample was held constant. Portions were weighed before and after injection and percent uptake of the salt solution determined by the formula:

$$\frac{\text{Injected weight} - \text{raw weight}}{\text{raw weight}} \times 100 = \text{percent uptake}$$

The injection solution used contained 10 percent NaCl and 5 percent polyphosphate.

In the other method of application, the salts were added singularly and in combination to the post-cook cooling solution. Concentration was calculated as percent of total weight of water and salt(s). Ice was added to the system just prior to adding the cooked chicken. No adjustment was made for melting ice. Levels of 0.5, 1.5 and 5 percent NaCl and 1, 3, 5 and 8 percent polyphosphate were studied.

The data in Table I demonstrate the ability of poultry which has been cooked in water and chilled in polyphosphate solution to absorb polyphosphate. In this table, the results indicated were all measured after cooling. In poultry marked "injected," each piece was injected with about 3.3 to 4.8 ml. of the indicated solution using about 0.3 ml. per injection site. "Kena" is a food grade blend of 90 percent sodium tripolyphosphate and 10 percent sodium hexametaphosphate (substantially pentasodium tripolyphosphate). The entry under "Est. Add 'Kena'" represents a single analysis and calculation based on a mixture of samples.

TABLE I

| | Moisture | Salt | P₂O₅ | Cook loss | Est. add "Kena" |
|---|---|---|---|---|---|
| | \multicolumn{5}{c|}{Percent} | |

| | Moisture | Salt | P₂O₅ | Cook loss | Est. add "Kena" |
|---|---|---|---|---|---|
| *Control water cook* | | | | | |
| C-38 | 68.2 | 0.17 | 0.33 | | |
| C-39 | 70.9 | 0.17 | 0.34 | | |
| C-40 | 65.1 | 0.17 | 0.31 | | |
| C-41 | 65.5 | 0.24 | 0.34 | | |
| C-42 | 66.7 | 0.19 | 0.35 | | |
| Average | 67.28 | 0.188 | 0.334 | 14.4 | 0.000 |
| *Cooked in water—Cooled in 1% "Kena"* | | | | | |
| SA 38 | *60.6 | 0.17 | 0.30 | | |
| SA 39 | 65.3 | 0.19 | 0.33 | | |
| SA 40 | 65.5 | 0.19 | 0.35 | | |
| SA 41 | 68.3 | 0.17 | 0.37 | | |
| SA 42 | 69.2 | 0.17 | 0.36 | | |
| Average | 67.1 | 0.178 | 0.342 | 14.0 | 0.016 |
| *Cooked in water—Cooled in 5% "Kena"* | | | | | |
| SB 38 | 69.1 | 0.20 | 0.50 | | |
| SB 39 | 69.1 | 0.20 | 0.46 | | |
| SB 40 | 70.2 | 0.20 | 0.47 | | |
| SB 41 | 68.2 | 0.19 | 0.48 | | |
| SB 42 | 69.7 | 0.20 | 0.47 | | |
| Average | 69.26 | 0.199 | 0.476 | 13.4 | 0.284 |
| *Injected 5% "Kena," 10% Salt (6.6% Uptake)* | | | | | |
| 1A 38 | 64.6 | 0.83 | 0.50 | | |
| 1A 39 | 68.3 | 0.75 | 0.51 | | |
| 1A 40 | 70.2 | 0.82 | 0.48 | | |
| 1A 41 | 69.5 | 0.97 | 0.51 | | |
| 1A 42 | 67.4 | 0.99 | 0.51 | | |
| Average | 68.0 | 0.872 | 0.502 | 7.6 | 0.336 |
| *Injected 10% "Kena," 10% Salt (5.3% Uptake)* | | | | | |
| 1B 38 | 70.0 | 0.83 | 0.62 | | |
| 1B 39 | 68.5 | 0.83 | 0.63 | | |
| 1B 40 | 64.2 | 0.82 | 0.60 | | |
| 1B 41 | 69.6 | 0.66 | 0.54 | | |
| 1B 42 | 66.0 | 0.75 | 0.55 | | |
| Average | 67.66 | 0.778 | 0.588 | 5.8 | 0.503 |

*Not used to calculate average.

Table II presents results of a demonstration in which the TBA value was measured on cooked chicken meat, cooled in either iced water or iced "Kena" solution, after 24 hours and after 7 days storage at 3° to 4° C. All "Kena" cooling solutions were at a strength of 5 percent. The series of samples 1A to 4A corresponds to the series 1B to 4B; i.e., 3A and 3B are samples from the same bird.

TABLE II

| No. | Treatment | 24 hours TBA | 7 days TBA | Percent P₂O₅ | Add "Kena" |
|---|---|---|---|---|---|
| 1A | Cooled 1 min. 5% "Kena." | 0.35 | 3.50 | 0.39 | |
| 2A | do | 3.50 | 11.00 | 0.38 | |
| 3A | do | 0.40 | 3.10 | 0.47 | |
| 4A | do | 4.60 | 11.00 | 0.40 | |
| Avg | | 2.21 | 7.15 | 0.41 | 0.00 |
| 1B-4B | Cooled 1 min. in water | 1.50 | 9.20 | 0.44 | |
| 5A | Cooled 2 min. in 5% "Kena." | 0.40 | 3.10 | 0.41 | |
| 6A | do | 0.80 | 4.80 | 0.42 | |
| 7A | do | 0.38 | 2.90 | 0.46 | |
| 8A | do | 0.38 | 3.80 | 0.38 | |
| Avg | | 0.49 | 3.65 | 0.42 | 0.00 |
| 5B-8B | Cooled 2 min. in water | 3.50 | 12.5 | 0.41 | |
| 9A | Cooled 3 min. in 5% "Kena." | 0.75 | 4.40 | 0.53 | |
| 10A | do | 0.35 | 1.90 | 0.45 | |
| 11A | do | 0.50 | 4.40 | 0.44 | |
| 12A | do | 0.45 | 4.90 | 0.50 | |
| Avg | | 0.51 | 3.90 | 0.48 | 0.16 |
| 9B-12B | Cooled 3 min. in water | 3.50 | 11.5 | 0.40 | |
| 13A | Cooled 5 min. in 5% "Kena." | 0.25 | 0.70 | 0.46 | |
| 14A | do | 0.25 | 1.00 | 0.43 | |
| 15A | do | 0.35 | 3.00 | 0.40 | |
| 16A | do | 0.25 | 1.10 | 0.45 | |
| Avg | | 0.28 | 1.45 | 0.43 | 0.06 |
| 13B-16B | Cooled 5 min. in water | 3.75 | 11.0 | 0.40 | |
| 17A | Cooled 10 min. in 5% "Kena." | 0.20 | 1.00 | 0.47 | |
| 18A | do | 0.25 | 0.60 | 0.46 | |
| 19A | do | 0.30 | 1.10 | 0.47 | |
| 20A | do | 0.20 | 0.50 | 0.50 | |
| Avg | | 0.24 | 0.80 | 0.48 | 0.14 |
| 17B-20B | Cooled 10 min. in water | 3.00 | 11.50 | 0.41 | |

Results in Table II show that cooked poultry chilled in water for 1 to 10 minutes exhibited 7 day TBA values of 9.2, 12.5, 11.5, 11.0 and 11.5 respectively for an average TBA value of 11.1. By contrast, cooked poultry cooled in 5 percent "Kena" solution for 1, 2, 3, 5, and 10 minutes, exhibited 7 day TBA values of 7.2, 3.7, 3.9, 1.5 and 0.8, respectively. These results demonstrate the effect of polyphosphate chilling solutions to reduce TBA values (a measure of oxidative deterioration).

Similar TBA reduction obtained with "Kena" chilling after 1 day of refrigerated storage.

TBA values were measured of cooked poultry samples cooled in polyphosphate solutions of various strengths for 5 minutes; results are indicated in Table III.

TABLE III

| No. | Treatment | Moist. | Percent P₂O₅ | Add "Kena" | TBA 24 hrs. | TBA 8 days |
|---|---|---|---|---|---|---|
| K1-1 | Control | 67.9 | 0.30 | | 6.50 | 8.20 |
| K1-2 | do | 65.1 | 0.28 | | 7.50 | 8.90 |
| K1-3 | do | 67.4 | 0.31 | | 7.00 | 9.20 |
| K1-4 | do | 64.5 | 0.29 | | 4.00 | 8.00 |
| K1-5 | do | 68.1 | 0.30 | | 6.50 | 9.20 |
| K1-6 | do | 67.5 | 0.29 | | 6.00 | 8.50 |
| Avg | | 66.75 | 0.295 | 0.00 | 6.25 | 8.67 |
| K2-1 | Cooled in 3% "Kena." | 68.4 | 0.36 | | 1.50 | 2.80 |
| K2-2 | do | 68.4 | 0.36 | | 1.90 | 5.20 |
| K2-3 | do | 67.3 | 0.36 | | 0.95 | 1.70 |
| K2-4 | do | 66.5 | 0.38 | | 1.75 | 2.60 |
| K2-5 | do | 66.9 | 0.36 | | 1.05 | 2.70 |
| K2-6 | do | 66.1 | 0.36 | | 2.05 | 4.00 |
| Avg | | 67.27 | 0.363 | 0.136 | 1.53 | 3.17 |
| K3-1 | Cooled in 5% "Kena." | 65.5 | 0.41 | | 1.50 | 1.85 |
| K3-2 | do | 63.9 | 0.40 | | 1.60 | 1.90 |
| K3-3 | do | 65.8 | 0.43 | | 2.00 | 3.00 |
| K3-4 | do | 68.4 | 0.40 | | 1.10 | 1.20 |
| K3-5 | do | 67.0 | 0.43 | | 1.30 | 1.35 |
| K3-6 | do | 68.0 | 0.42 | | 0.90 | 2.15 |
| Avg | | 66.43 | 0.415 | 0.240 | 1.40 | 1.91 |
| K4-1 | Cooled in 8% "Kena." | 64.1 | 0.45 | | 0.83 | 0.90 |
| K4-2 | do | 66.1 | 0.45 | | 0.85 | 1.30 |
| K4-3 | do | 62.9 | 0.44 | | 1.10 | 1.55 |
| K4-4 | do | 64.4 | 0.45 | | 1.40 | 2.05 |
| K4-5 | do | 65.8 | 0.46 | | 1.15 | 1.95 |
| K4-6 | do | 64.5 | 0.43 | | 1.30 | 3.00 |
| Avg | | 64.63 | 0.447 | 0.304 | 1.105 | 1.792 |

Table III again illustrates that added phosphate to the cooked and chilled chicken meat is related to the polyphosphate concentration in the chill solution. Also, TBA value after 1 and 8 days of refrigerated storage decreased as the concentration of polyphosphate in the chill solution was increased.

In Table IV, it will be seen that the results are not significantly affected by the use of poultry, which had been frozen and stored in a frozen condition prior to cooking, versus the use of fresh unfrozen poultry.

TABLE IV

| No. | Label | Treatment | Cook loss, percent | 24 hrs. TBA | TBA 8 days | Percent Moist. | P₂O₅ | Add "Kena" |
|---|---|---|---|---|---|---|---|---|
| 1 | C-1 | Control—frozen | 14.1 | 4.2 | 7.5 | 62.4 | 0.26 | |
| 2 | C-2 | Control | | 4.8 | 6.7 | 62.1 | 0.26 | |
| 3 | C-3 | do | | 4.2 | 7.5 | 65.0 | 0.26 | |
| 4 | C-4 | do | | 4.1 | 7.2 | 66.1 | 0.31 | |
| 5 | C-5 | do | | 3.6 | 7.5 | 65.8 | 0.30 | |
| 6 | C-6 | do | | 3.5 | 8.2 | 66.2 | 0.31 | |
| Average | | | | 4.07 | 7.43 | 64.60 | 0.283 | 0 |
| 7 | SA-1 | Cooled 1% "Kena"—frozen | 12.7 | 2.0 | 4.9 | 65.9 | 0.34 | |
| 8 | SA-2 | do | | 2.8 | 7.6 | 63.3 | 0.34 | |
| 9 | SA-3 | do | | 2.6 | 7.0 | 41.1 | 0.28 | |
| 10 | SA-4 | do | | 1.4 | 5.6 | 66.5 | 0.30 | |
| 11 | SA-5 | do | | 1.9 | 7.6 | 65.2 | 0.35 | |
| 12 | SA-6 | do | | 1.7 | 6.9 | 66.1 | *0.48 | |
| Average | | | | 2.07 | 6.6 | 65.2 | 0.322 | 0.08 |
| 13 | SB-1 | Cooled 5% "Kena"—frozen | 17.0 | 0.75 | 1.25 | 64.9 | 0.54 | |
| 14 | SB-2 | do | | 0.90 | 1.3 | 67.1 | 0.54 | |
| 15 | SB-3 | do | | 0.82 | 1.3 | 62.4 | 0.47 | |
| 16 | SB-4 | do | | 1.10 | 1.1 | 63.5 | 0.47 | |
| 17 | SB-5 | do | | 0.83 | 0.75 | 63.6 | 0.47 | |
| 18 | SB-6 | do | | 0.95 | 0.80 | 63.8 | 0.45 | |
| Average | | | | 0.892 | 1.08 | 64.22 | 0.49 | 0.41 |
| 19 | FSB-1 | Cooled in 5% "Kena"—fresh | 24.1 | 1.1 | 1.15 | 63.0 | 0.52 | |
| 20 | FSB-2 | do | | 0.85 | 0.55 | 63.2 | 0.57 | |
| 21 | FSB-3 | do | | 0.95 | 1.00 | 64.2 | 0.55 | |
| 22 | FSB-4 | do | | 0.90 | 1.15 | 66.0 | 0.54 | |
| 23 | FSB-5 | do | | 1.0 | 1.10 | 62.9 | 0.57 | |
| 24 | FSB-6 | do | | 1.0 | 1.20 | 64.1 | 0.56 | |
| Average | | | | 0.967 | 1.025 | 63.90 | 0.552 | 0.54 |

*Did not use this out-of-line figure in calculations.

Any method of cooking may be used in our invention. Cooking in water is preferred, but microwave and steam cooking are also thoroughly compatible with our invention. If the poultry is cooked in water, the temperature should be at least 80° C. The cooling process in the phosphate solution should commence as soon as practicable upon removal of the poultry from the cooking zone; i.e., preferably while the poultry is still at a temperature of at least 78° C., although any practical cooking temperature, i.e., as low as 70° C., is operable. The phosphate solution will normally contain sufficient quantities of ice to maintain the solution temperature throughout the cooling process from 0° C. to about 4° C. However, the temperature of the cooling solution may be as high as 10° C. The phosphate solution should contain at least 2 percent by weight (not including ice) non-cyclic alkali metal polyphosphate having a ratio of alkali metal oxide to P₂O₅ of about 1:1 to 2:1. This includes the metaphosphates, pyrophosphates, and tripolyphosphates. Such phosphates may be present in the solution in amounts approaching saturation, i.e., 35 percent in the case of tripolyphosphate. However, practical considerations indicate a preferred maximum of about 10 percent by weight. The solution may include liberal amounts of NaCl, preferably no greater than 10 percent by weight. Duration of the cooling process should normally be no longer than 30 minutes and will almost always require at least 2 minutes. The preferred cooling soak will be at least 5 minutes, lasting until the temperature of the poultry is no greater than 10° C. Upon completion of the cooling process, the preferred procedure is immediately to package and freeze the poultry.

The retention of "moisture," as shown by analysis, actually reflects the retention of natural juices including soluble protein and other nutrients. This is accomplished without a significant weight change such as takes place in the practice of arterial pickle pumping in hams. The TBA value is of particular significance in poultry.

We do not intend to be bound by the particular illustrations and examples herein. Our invention may be otherwise variously practiced within the scope of the following claims.

We claim:

1. Method of treating poultry comprising cooking said poultry, immersing the cooked poultry upon removal from the cooking zone and while still hot into a cooking solution, having a temperature no greater than 10° C. of from about 2 percent to about 10 percent non-cyclic alkali metal polyphosphate, cooling the poultry therein for a period of from about 2 to about 30 minutes, and removing the poultry from the cooling solution.

2. Method of claim 1 followed immediately by packaging and freezing.

3. Method of claim 1 in which the temperature of the cooling solution is maintained from 0° C. to 4° C.

4. Method of claim 1 in which the polyphosphate has an alkali metal oxide to P₂O₅ ratio of about 1:1 to 2:1.

5. Method of claim 1 in which the cooling solution includes up to about 10 percent salt.

6. Method of treating poultry comprising cooking said poultry in water at a temperature of at least 80° C. for a period of at least 20 minutes, removing said poultry from the cooking water and, while the poultry is still at a temperature of at least 70° C., immersing it in a cooling solution of at least 5 percent of a non-cyclic alkali metal polyphosphate having a temperature, prior to the immersion, of about 0° C. to 4° C., and retaining said poultry in said solution for at least 5 minutes.

7. Method of claim 6 in which the polyphosphate is substantially pentasodium tripolyphosphate.

References Cited

UNITED STATES PATENTS 3,104,170   9/1963   Mahon _____ 99—107

HYMAN LORD, Primary Examiner